United States Patent
Huang

(10) Patent No.: US 6,464,302 B1
(45) Date of Patent: Oct. 15, 2002

(54) STRUCTURAL IMPROVEMENT OF A WHEEL

(76) Inventor: Chuan-Hai Huang, No. 53-56, Shiakeng, Shiakeng Tsuen, Fanlu Shiang, Chia-I-Hsien (TW)

( * ) Notice: Subject to any disclaimer, the term of this patent is extended or adjusted under 35 U.S.C. 154(b) by 0 days.

(21) Appl. No.: 09/985,986

(22) Filed: Nov. 7, 2001

(51) Int. Cl.$^7$ .............................. B60B 37/00; B60B 3/10
(52) U.S. Cl. .................................. 301/5.1; 301/64.101
(58) Field of Search .............................. 301/5.1, 5.301, 301/5.307, 5.304, 5.306, 37.101, 37.102, 37.35, 37.36, 37.42, 37.29, 64.101, 64.102, 64.201, 64.202

(56) References Cited

U.S. PATENT DOCUMENTS

| | | | |
|---|---|---|---|
| 3,048,447 A | * 8/1962 | Klint | 301/5.1 |
| 5,046,784 A | * 9/1991 | Carter, III | 301/37.101 |
| 5,388,623 A | * 2/1995 | Homma et al. | 301/5.301 |
| 5,655,785 A | * 8/1997 | Lee | 301/5.301 |
| 5,797,661 A | * 8/1998 | Lee et al. | 301/5.1 |
| 5,810,450 A | * 9/1998 | Tsu et al. | 301/5.301 |
| 6,106,074 A | * 8/2000 | Chang | 301/5.301 |
| 6,139,040 A | * 10/2000 | Dempsey | 301/64.7 |
| 6,322,154 B1 | * 11/2001 | Alderman et al. | 301/5.303 |

* cited by examiner

*Primary Examiner*—S. Joseph Morano
*Assistant Examiner*—Long Bao Nguyen
(74) *Attorney, Agent, or Firm*—Rosenberg, Klein & Lee

(57) ABSTRACT

The present invention relates to the structural improvement of a wheel, and more particularly to an assembled wheel structure that has excellent resilience and no need to fill in air as well as is free of air leakage and easy to be disassembled. The present invention is constructed by a wheel body and a tire, wherein the wheel body is further constructed by a wheel shell and a matching wheel cover, while the tire, made of resilient materials (e.g., plastic, PU, etc.), inside accommodates a resilient inner tire to provide double-layered resiliency. There are several position pads on both sides of the inner circumference of the tire and the position pads 421, 431 on two sides are alternated with each other. A hole 422, 432 is formed on each position pad 421, 431 to allow the position rods to set in place and form a complete wheel structure.

3 Claims, 7 Drawing Sheets

STRUCTURAL IMPROVEMENT OF A WHEEL

BACKGROUND OF THE INVENTION (1) Field of the Invention

The present invention relates to the structural improvement of a wheel, and more particularly to an assembled wheel structure that has excellent resilience and no need to fill in air as well as is free of air leakage and easy to be disassembled.

(2) Description of the Prior Art

Please refer to FIG. 1, a schematic structural view of a prior wheel. According to the structure of a wheel 10 (here referring to the wheel used by bicycles, electrical scooters, wheelchairs, trailers, etc.), its main structures may include an outer rubber tire 11 with an air nuzzle 13 attached to a wheel frame 12 which provides structural support to the expansion of the rubber tire 11. The wheel 10 often encounters a major problem, i.e., air leakage of the rubber tire 11 caused by the penetration of pushpins or other sharp objects. As a result, the wheel 10 needs to be refilled with air, the rubber tire 11 is damaged, or, in more severe cases, the rubber tire 11 is detached from the wheel frame 12, which causes the direct contact of the wheel frame 12 with ground surface and the friction deforms the wheel frame 12. In such case, the wheel frame 12 or the entire wheel 10 needs to be replaced. Furthermore, the tire is made of rubber that is not resistant to friction and has poor resilience, and when the wheels 10 of bicycle 20 have poor resilience, the comfort of the bicycle rider is often compromised.

SUMMARY OF THE INVENTION

Because of the stated shortcomings of existing wheels used by bicycles, electrical scooters, wheelchairs, etc., I propose a possible solution, the present invention, after a sequence of continuous researches, developments, and improvements as well as many tests. The present invention is constructed by a wheel body and a tire, wherein the tire is made of resilient materials (e.g., plastic, PU, etc.) and the wheel body is further constructed by a wheel shell and a matching wheel cover, so that the wheel structure has excellent resilience, is free of air leakage, and can to be partially disassembled.

The primary objective of the present invention is to provide a wheel structure with excellent resilience and good friction resistance. By means of double-layered resiliency, rider comfort is improved while the wear of tire surface is effectively reduced to prolong the usable time of the wheel.

The other objective of the present invention is to provide a wheel structure that needs not to fill in air or worry about air leakages.

BRIEF DESCRIPTION OF THE DRAWINGS

The present invention will now be specified with reference to its preferred embodiment illustrated in the drawings, in which.

DESCRIPTION OF THE PREFERRED EMBODIMENT

Figure 1:
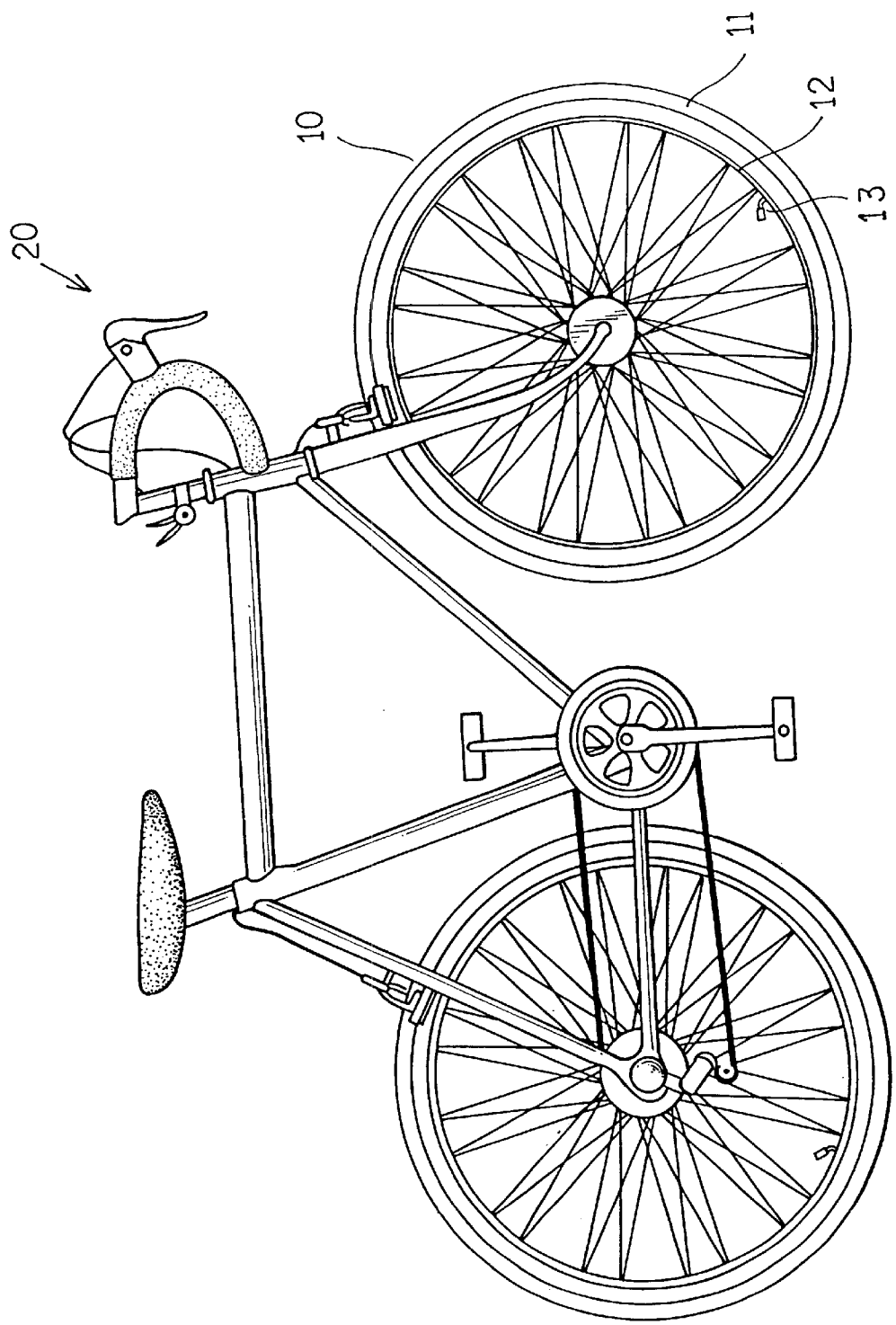
FIG. 1 is a schematic view of a prior wheel structure.
Figure 2:
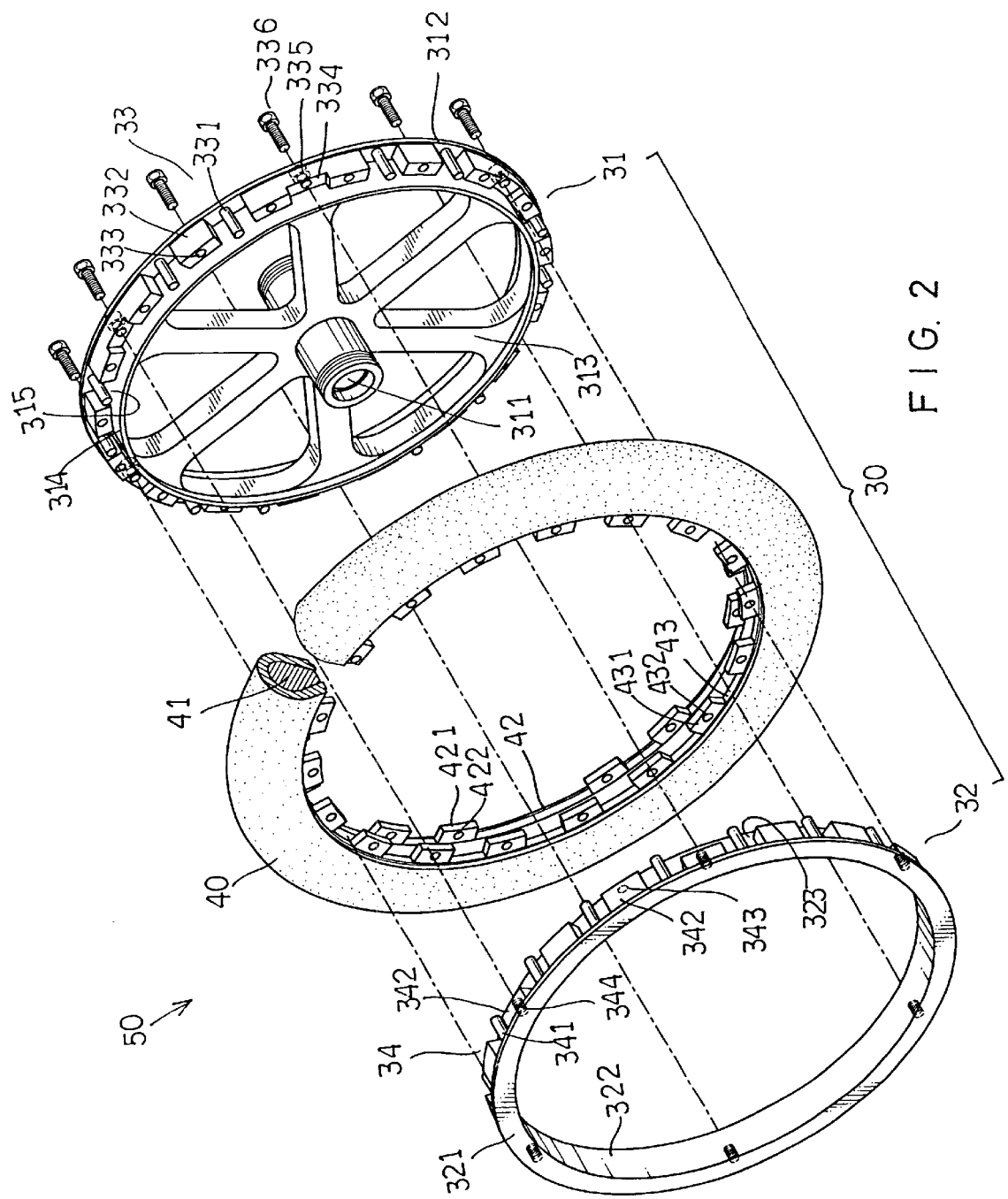
FIG. 2 is a schematic explosion view of the present invention.
Figure 3:
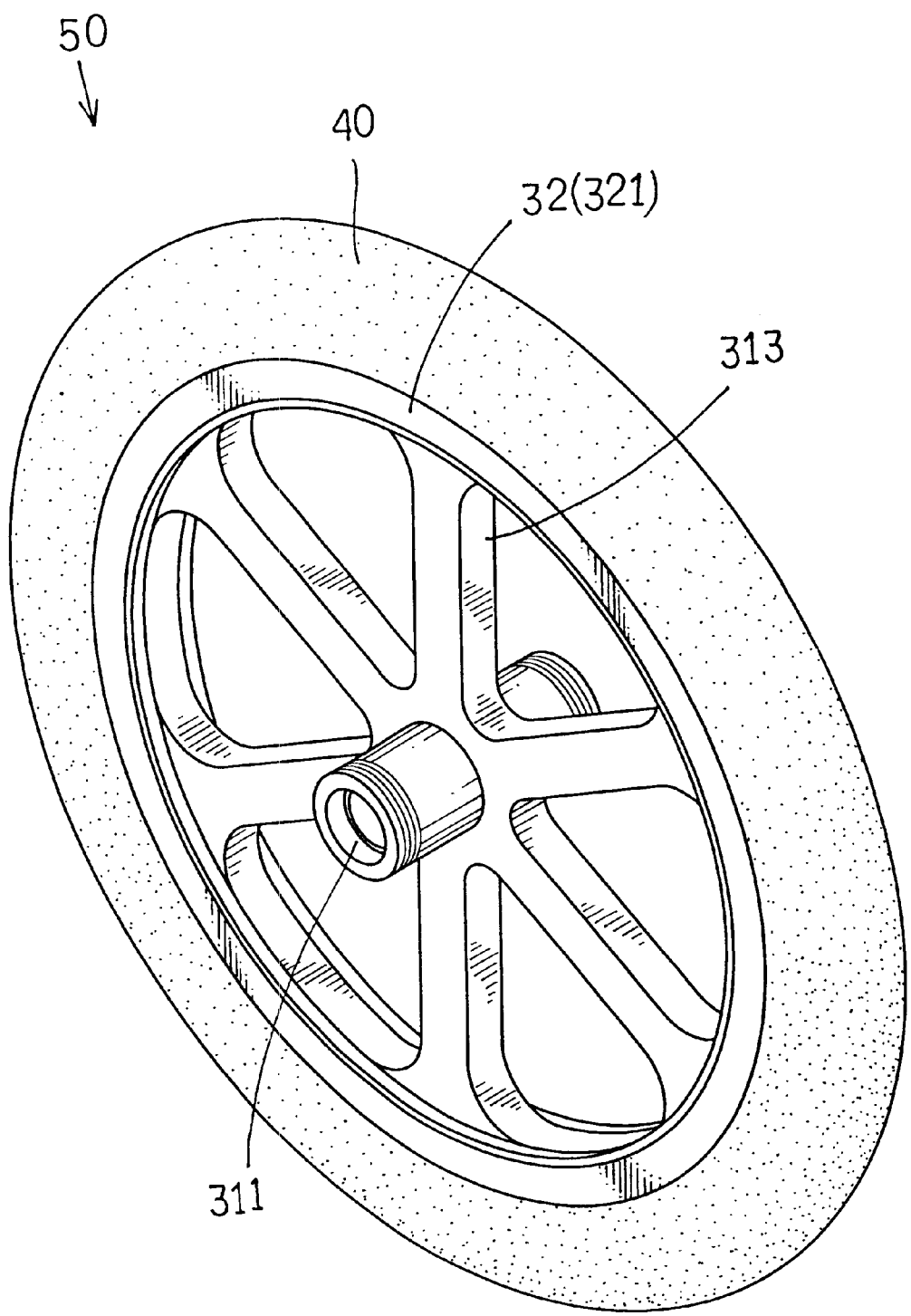
FIG. 3 is a schematic assembled view of the present invention.
Figure 4:
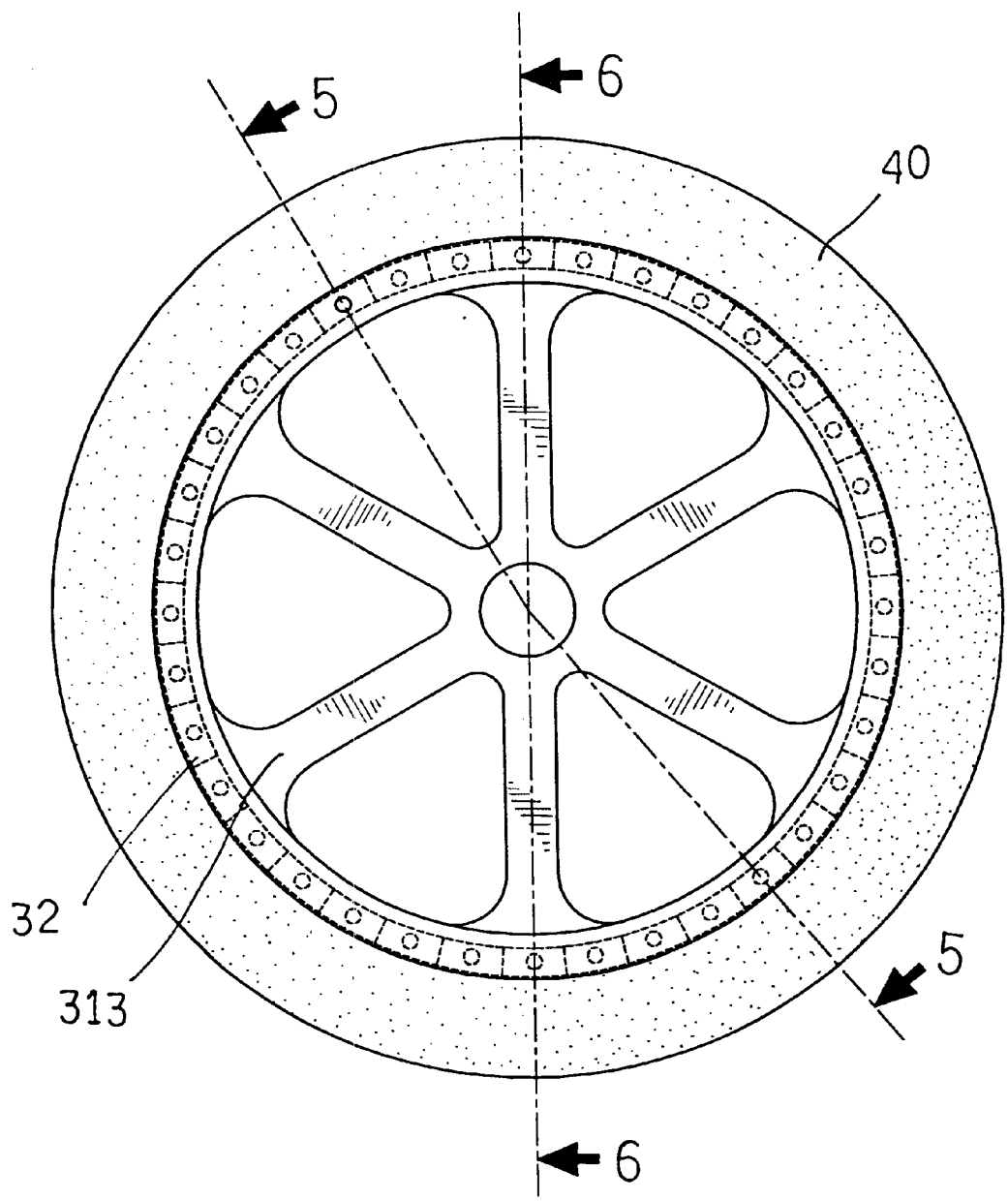
FIG. 4 is a schematic front view of the present invention.
Figure 5:
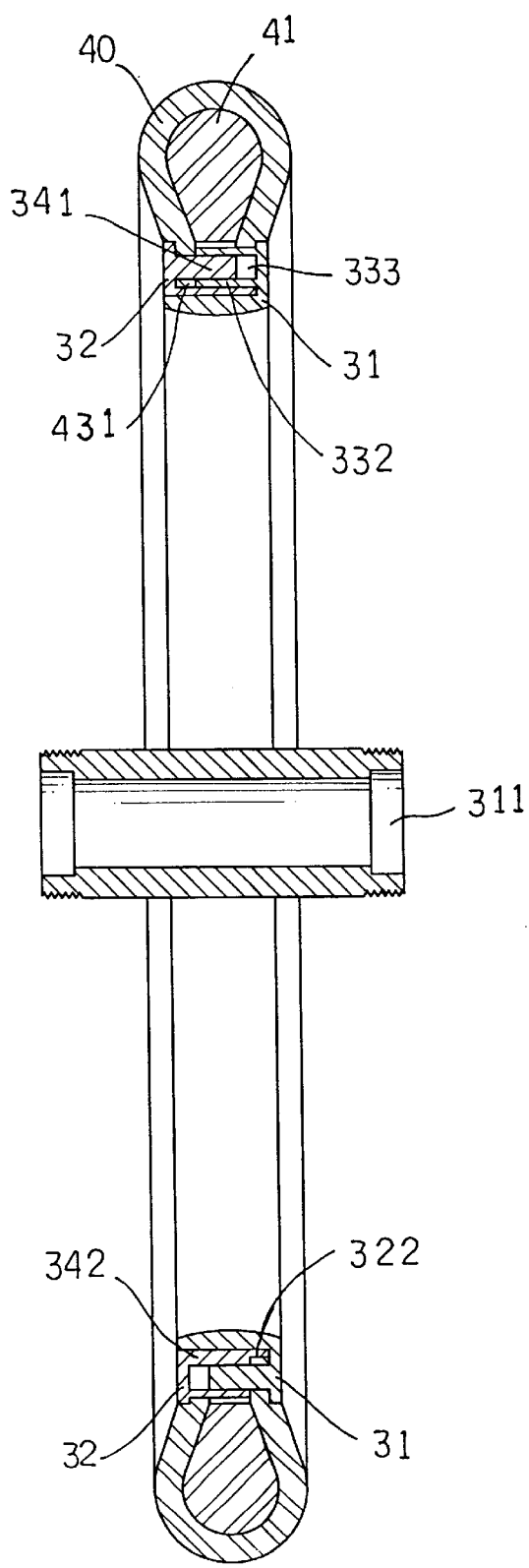
FIG. 5 is a first schematic cross-section view of FIG. 4.
Figure 6:
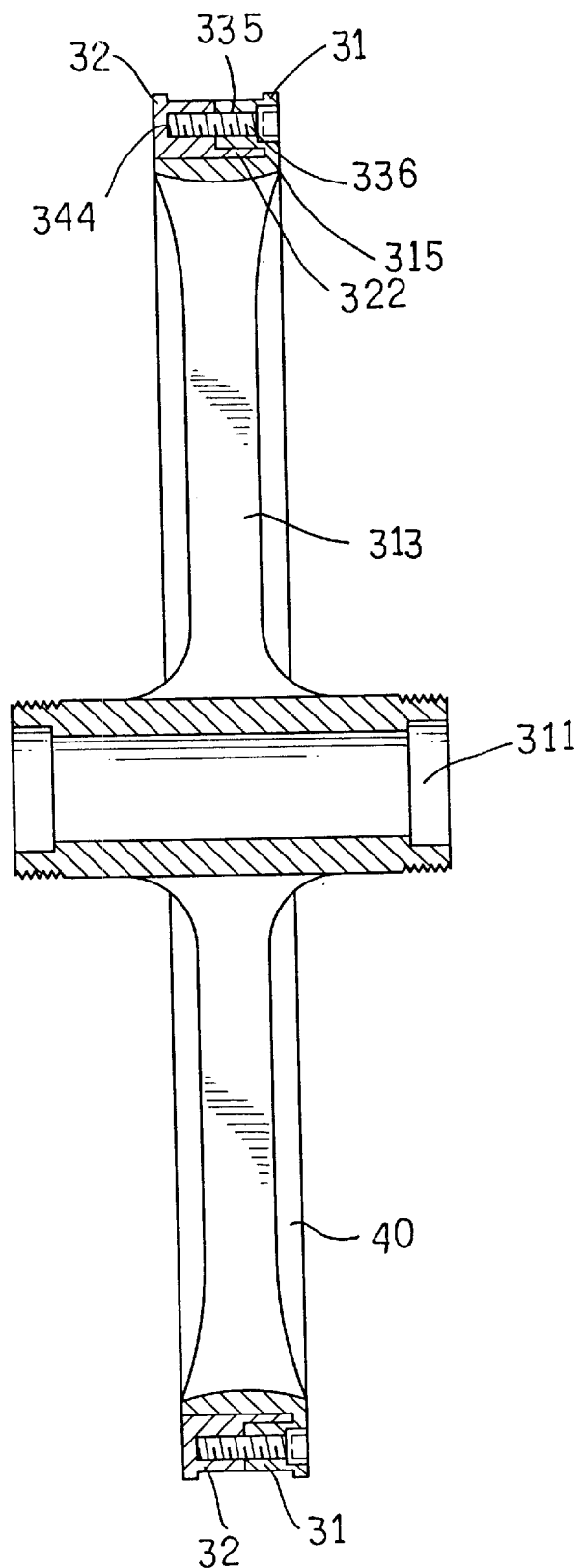
FIG. 6 is a second schematic cross-section view of FIG. 4.

The invention disclosed herein is directed to the structural improvement of a wheel. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

The present invention relates to the structural improvement of a wheel 50, please referring to FIG. 2 to FIG. 6, mainly comprising:

A wheel body 30, constructed by a wheel shell 31 and a matching wheel cover 32, wherein:

The wheel shell 31, whose center has a shaft hole 311, includes a tire ring 312 on its outermost circumference, radiant supporting beams 313 formed between the shaft hole 311 and the tire ring 312 and centered around the shaft hole 311, a circular concave rim 314 formed along the inner circumference of the tire ring 312 and on the same side surrounded by position fixtures 33 perpendicular to the tire ring 312. The position fixtures 33 are constituted of several position rods 331 and position stands 332, wherein the position rods 331 and position stands 332 are alternated at equal distance intervals, and a hole 333 is formed on each position stand 332. At the positions corresponding to the supporting beams 313, the position rod 331 is replaced by a convex stand 334. There is a screw hole 335 on the convex stand 334 for a screw 336 to be inserted and secured. A trench 315 is formed between the circular concave rim 314 and the position fixture 33.

The wheel cover 32, a circular ring, includes a circular convex rim 322 around the inner circumference of a tire ring 321 in order to set in and be fixed into the trench 315 of the wheel shell 31, and on the same side surrounded by position fixtures 34 perpendicular to the tire ring 321. The position fixtures 34 are constituted of several position rods 341 and position stands 342, wherein the position rods 341 and position stands 342 are alternated at equal distance intervals, and a hole 343 is formed on part of position stands 342, while a screw hole 344 is formed on part of position stands 342 where the screw hole 344 is corresponding to the screw hole 335 of the convex stand 334 of the wheel shell 31 and does not penetrate the position stand 342. A trench 323 is formed between the stated circular convex rim 322 and the position fixture 34 in order for the circular concave rim 314 of the wheel shell 31 to set in.

A tire 40, made of resilient material (e.g., plastic, PU, etc.), includes an internal trench (unnumbered) in order to accommodate a resilient inner tire 41. The convex rims 42, 43 are located separately on both sides of the inner circumference of the tire 40. There are several position pads 421, 431 on the convex rims 42, 43 matched with the position rods 42, 43 of the wheel body 30. The position pads 421, 431 on two sides are alternated with each other, and a hole 422, 432 is formed on each position pad 421, 431.

During assembling, the tire 40 is placed between the wheel shell 31 and wheel cover 32, so the position rods 331, 341 of the wheel shell 31 and wheel cover 32 are matched respectively with the position pads 421, 431 on the both sides of the tire 40 to allow the position rods 331 (341) to go through the position pad 421 (431) and set in the position stand 342 (332) of the wheel cover 32 (wheel shell 31), which forms a sturdy assembled state. When a wheel 50 is formed through matching assembling, and the screw holes 335, 344 of the wheel shell 31 and wheel cover 32 are corresponding to each other and allows to enforce the strength of the assembled state by means of tightening up a screw 336.

Figure 7:
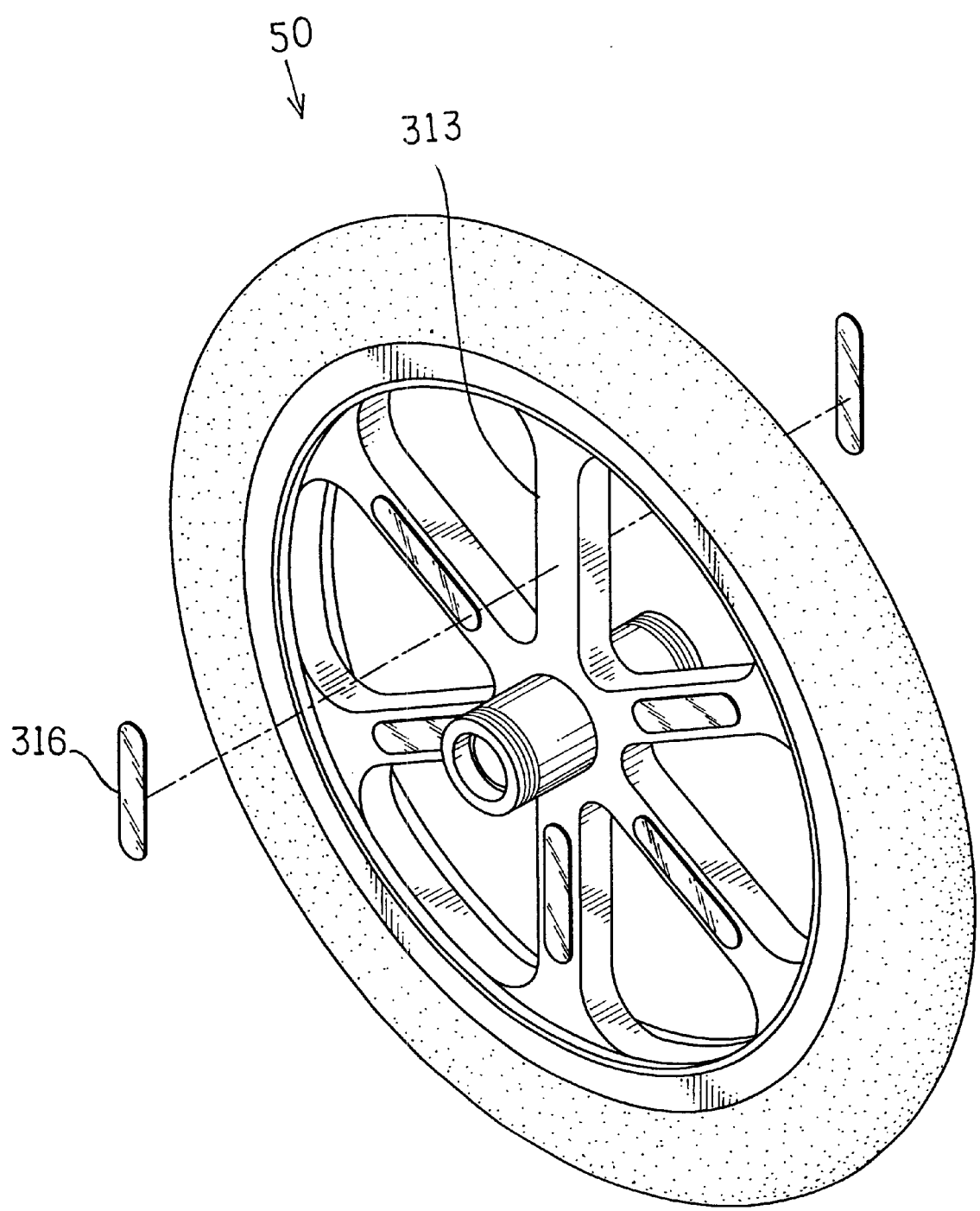
FIG. 7 is a schematic view of an embodiment of the present invention.

Furthermore, please refer to FIG. 7, another embodiment of the present invention, wherein reflecting patches 316 or reflecting studs are placed on the radiant supporting beams 313 of the wheel shell 31.

On the other hand, worthy of mentioning, since there is an inner tire 41 inside of the tire 40 of the present invention, by means of double-layered resilience, the tire 40 has excellent resilience and friction resistance to provide adequate rider comfort when utilized in bicycles. The tire 40 of the present invention is made of materials like plastic or PU, so its resilience is not affected even when the tire is used alone without the inner tire.

Besides, when there is a need to change the tire, it only needs to screw off the screw 336 and then insert a long screw into the screw hole (335, 344) and hammer the screw to detach the wheel cover 32, the wheel structure can be easily dissembled and replaced.

Summarized from the description stated above, the present invention provides an effective improvement solution of the prior art, therefore, it meets all the patent requirements.

While the present invention has been particularly shown and described with reference to a preferred embodiment, it will be understood by those skilled in the art that various changes in form and detail may be without departing from the spirit and scope of the present invention.

I claim:

1. The structural improvement of a wheel, comprising:
   a wheel body, assembled by a wheel shell face with a matching wheel cover; wherein
   said wheel shell, whose center has a shaft hole, includes a tire ring on the outermost circumference, radiant supporting beams formed between said shaft hole and said tire ring and centered around said shaft hole, a circular concave around the inner circumference of said tire ring and on the same side surrounded by position fixtures perpendicular to said tire ring, wherein said position fixture are constituted of several position rods and position stands that are alternated at equal distance intervals, and a hole is formed on each said position stand, while at the positions corresponding to said supporting beams, said position rod is replaced by a convex stand for a screw to be inserted and secured, then a trench is formed between said circular concave rim and said position fixture;
   said wheel cover, a circular ring, includes a circular convex rim around the inner circumference of a tire ring in order to set in and be fixed onto said trench of said wheel shell, and on the same side surrounded by position fixtures perpendicular to said tire ring, wherein said position fixture are constituted of several position rods and position stands that are alternated at equal distance intervals, and a hole is formed on part of said position bases, while a screw hole on part of said position stands where said screw hole is corresponding to said screw hole of said convex stand of said wheel shell and does not penetrate said position stand, then a trench is formed between said circular convex rim and said position fixture in order for said circular concave rim of said wheel shell to set in;
   a tire, made of elastic material, which has an U-shape cross-section and includes two convex rims located separately on each sides of the inner circumference of said tire and several position pads on said convex rims matched with said position rods of said wheel body, wherein said position plates on two sides are alternated with each other and a hole is formed on each said position pads.

2. The structural improvement of a wheel according to claim 1, wherein said tire further includes an internal trench in order to accommodate a resilient inner tire.

3. The structural improvement of a wheel according to claim 1 or claim 2, wherein reflecting patches (316) or reflecting studs are placed on the radiant supporting beams (313) of the wheel shell (31).

* * * * *